May 12, 1936.   H. E. McCRERY   2,040,703
APPARATUS FOR CONTROLLING THE FLOW OF MATERIAL
Filed Nov. 6, 1935   3 Sheets-Sheet 3
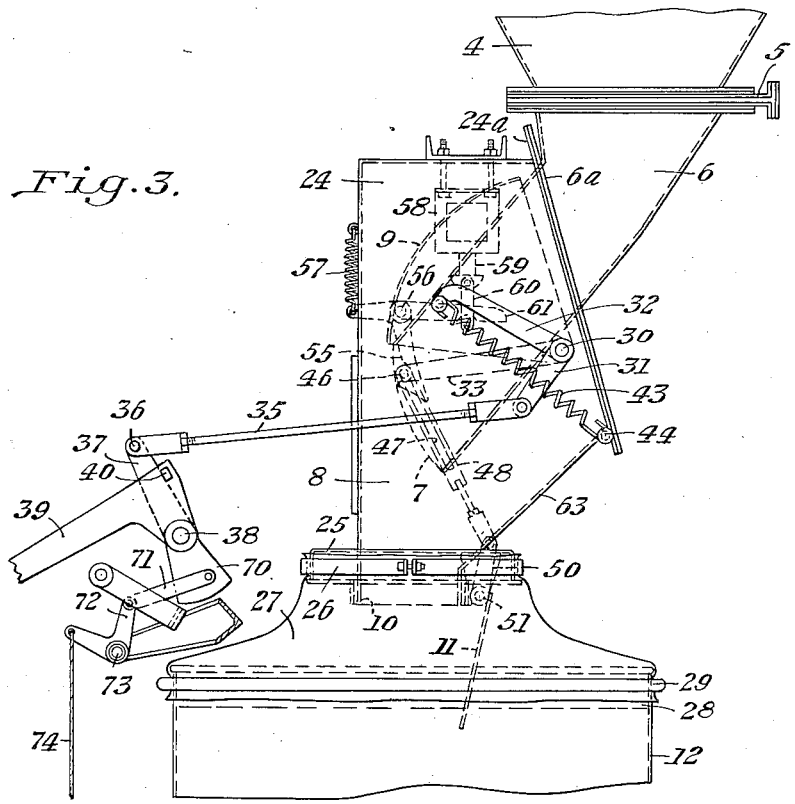
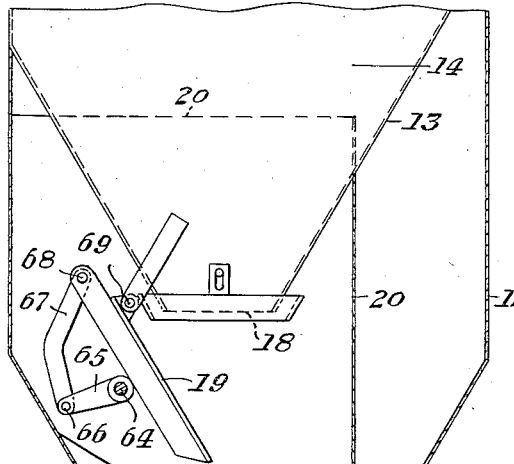
INVENTOR
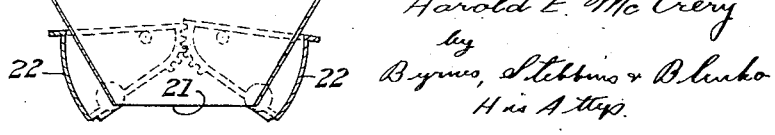

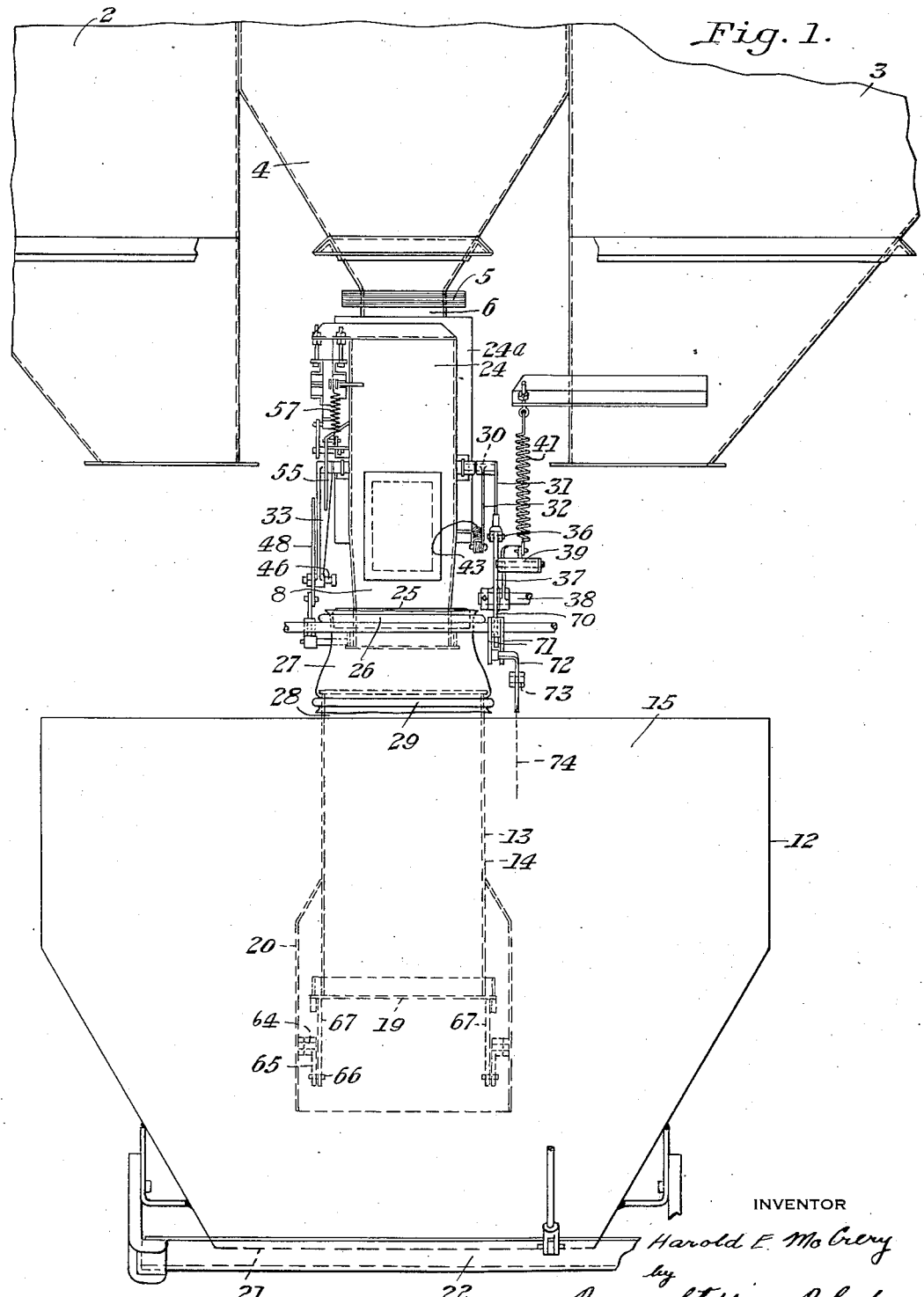

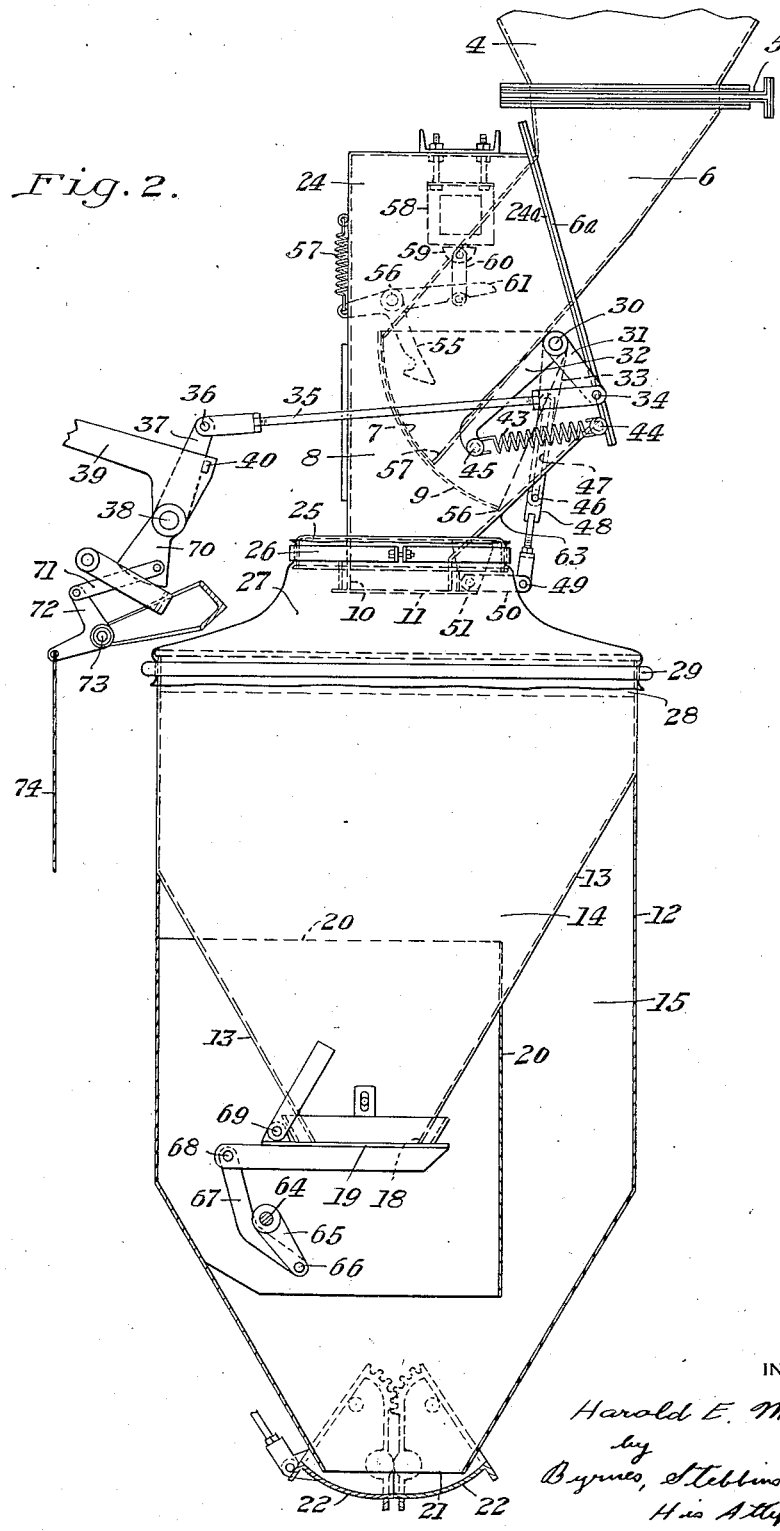

Patented May 12, 1936

2,040,703

UNITED STATES PATENT OFFICE 2,040,703

APPARATUS FOR CONTROLLING THE FLOW OF MATERIAL

Harold E. McCrery, Pittsburgh, Pa., assignor to Blaw-Knox Company, Blawnox, Pa., a corporation of New Jersey Application November 6, 1935, Serial No. 48,543

2 Claims. (Cl. 221—144)

This invention relates generally to apparatus for controlling the flow of material and is described herein particularly as applied to controlling the flow of cement into the weighing hopper of a cement batcher.

In making up concrete, batches of cement and other material, such as sand and stone, are delivered from separate bins into a weighing hopper connected to a scale, and after the separate batches have been weighed, they are discharged from the weighing hopper into a concrete mixer. In my application Serial No. 48,544, filed November 6, 1935 I have described and claimed apparatus for controlling the flow and weighing out batches of ingredients other than cement which go to make up the concrete mixture. The present application relates particularly to gate mechanism for controlling the flow of cement into the weighing hopper. It may be used in connection with the devices shown in the aforementioned application, where several materials are weighed on the same scales, or in connection with weighing batches of cement only, without other materials. The cement is much finer than the other ingredients which go to make up the concrete batch, and it is very difficult to make an easy working, quick acting single gate that will effectively stop the flow of cement suddenly. In the present invention, these difficulties are avoided by the use of two gates, one capable of stopping the bulk of the flow suddenly, and the other capable of stopping effectively what leaks past the first gate. This invention employs two gates operatively connected to each other, so that opening of one gate causes opening of another, and closing of one gate causes closing of the other. The gate through which the cement first passes is made to have a relatively loose fit with the discharge opening which it controls, as compared with the fit of a second gate controlling a second discharge passage through which the cement flows after its passage through the first discharge passage. Upon closing the first gate, the principal flow of cement is shut off, but due to its relatively loose fit, there may be slight leakage. The cement which leaks past the first gate is intercepted by a second gate having a relatively tight fit with its discharge opening. In this manner, due to the fact that the first gate has a relatively loose fit, it may be made to work easily and quickly. The first gate must take the pressure of the cement, and the impact of stopping the flow; the second gate has very little pressure to resist, and no impact; and consequently may be closed tightly as well as quickly.

In the accompanying drawings which illustrate the present preferred embodiment of my invention, Figure 1 is a front elevation;

Figure 2 is a side elevation, parts of the weighing hopper being shown in section. In this figure the gates for controlling the flow of cement are closed;

Figure 3 is a partial view similar to Figure 2, but showing the gates opened; and Figure 4 is a vertical section through the lower portion of the weighing hopper showing the weighing hopper gates opened so as to discharge the batch from the hopper.

Referring now more particularly to the drawings, there is shown a bin 2 for a material such as crushed stone, a bin 3 for a material such as sand, and a bin 4 for cement. The apparatus for delivering the stone and sand, for example, from the bins 2 and 3, respectively, are described and claimed in my above referred to application, the present application being restricted to the delivery of cement or other fine material from the bin 4.

The bin 4 is provided with a main shut-off gate 5 controlling the flow of cement into a chute 6. The chute delivers the cement through a discharge opening 7 into a conduit 8, the flow of cement through the discharge opening 7 being controlled by a gate 9 which in Figure 2 is shown closed and in Figure 3 opened. From the conduit 8 the cement flows through a discharge opening 10 controlled by a gate 11 into a weighing hopper 12.

The weighing hopper is divided by partitions 13 into a cement compartment 14 and a compartment 15 for the stone and sand. The cement compartment 14 is provided with a discharge opening 18 controlled by a gate 19. A shroud 20 protects the operating mechanism for the gate 19 from contact with the material in the compartment 15. The hopper 12 is provided with a discharge opening 21 controlled by two gates 22 which are geared together so as to open and close together and are connected as shown in my above referred to application so that as they are opened and closed, the gate 19 is opened and closed.

The conduit 8 into which the cement is discharged from the chute 6 is formed by a casing 24 having a flange 24a secured to a flange 6a on the chute 6. The bottom portion of the casing 24 is provided with a collar 25 to which is secured, by means of a clamp 26, the upper end of a piece of flexible fabric 27, the lower end of which is secured to the upper end 28 of the cement compartment 14 by means of a clamp 29. The fabric bag is used to prevent scattering of cement as it flows from the conduit 8 into the cement compartment 14. The hopper 12 is connected to a scale for weighing the different materials delivered thereto.

The drop gate 9 which controls the flow of cement from the chute 6 into the conduit 8 is rigidly secured to a shaft 30 so that upon clockwise rotation of the shaft as viewed in Figure 2, the gate is moved from the closed position shown in this figure to the open position shown in Figure 3. Also rigidly connected to the shaft 30 are arms 31, 32 and 33. The arms 31 and 32 are located at the right-hand side of casing 24, while the arm 33 is located at the left-hand side of the casing 24, as indicated in Figure 1. The arm 31 is pivoted as indicated by the reference numeral 34 to one end of a rod 35, the other end of which is pivoted at 36 to an arm 37 mounted on a rock-shaft 38. An operating handle 39 is also mounted on the shaft 38 and is provided with a lug 40 which contacts with the arm 37 so that upon counter-clockwise rotation of the arm 39 against the action of a spring 41, the arm 37 is also rotated counter-clockwise about its pivot 38, and through the connections described, the gate 9 is raised to its open position shown in Figure 3. A spring 43 connected at one end 44 to the casing 24 and at its other end 45 to the end of arm 32, urges the gate 9 closed.

The arm 33, which also is rigidly connected to the shaft 30, is provided at its lower end with a pin 46 fitting in a slot 47 in a push rod 48 having its lower end pivoted at 49 to an arm 50 rigidly secured to the gate 11 which is pivoted at 51. The pin 46 serves two functions. When it is moved into the position shown in Figure 3 upon opening of the gate 9, it engages a latch 55 pivoted at 56 and normally urged by spring 57 into position to engage the pin 46. The action of spring 57 is counteracted upon energizing a solenoid 58 so as to draw the core 59 of the solenoid upwardly into the position shown in Figure 2. The core 59 is connected by a link 60 to an arm 61 of the latch 55 so that when the solenoid is energized, it draws the core upwardly, thereby throwing the latch 55 out of engagement with the pin 46 and allows the spring 43 to rapidly close the gate 9.

The gates 9 and 11 are operatively connected to each other so that when the gate 9 is opened, the gate 11 is also opened, and when the gate 9 is closed, the gate 11 is also closed. When the parts are in the position indicated in Figure 2, the pin 46 is in engagement with the lower end of the slot 47 and exerts a downward thrust on the push rod 48 so as to maintain the gate 11 closed. When, however, the gate 9 is opened by operating the handle 39, the arm 33 rotates clockwise about the shaft 30, thereby releasing the downward pressure on the push rod 48 and allowing the gate 11 to open. The gate 11 starts to open before the lower edge 56 of the gate 9 passes the bottom wall 57 of the discharge chute 6. Upon further movement of the pin 46 as the gate 9 is moved to its open position shown in Figure 3, the pin 46 slides in the slot 47.

The construction of the connections between the gates 9 and 11 is such that the gate 11 does not close until after the gate 9 is closed. That is, the gate 11 does not close until the lower edge 56 of the gate 9 has passed the bottom 57 of the chute 6. This is accomplished by the provision of the slot 47. During the first part of the closing movement of the gate 9, the pin 46 slides in the slot 47; but at approximately the time that the lower edge 56 of the gate 9 is passing the bottom 57 of the chute 6, the pin 46 engages the bottom of the slot 47 and exerts downward pressure on the push rod 48 so as to close the gate 11.

The gate 9 makes a relatively loose fit with the discharge opening of the chute 6 so that it may be rapidly and easily closed. With such construction, some leakage of cement will occur between the bottom of the chute and the gate. It will be noted that when the gate 9 is in its closed position indicated in Figure 2, its lower edge contacts with a plate 63 forming one of the walls of the casing 24. The cement which leaks past the bottom 57 of the chute 6 is collected in the space above the wall 63 and below the bottom of the chute. Any cement which may leak past between the wall 63 and the lower edge 56 of the gate 9 is intercepted by the tightly closing gate 11.

After the proper amounts of cement and other ingredients which go to make up the concrete batch have been weighed out in the hopper 12, the doors 22 and 19 are opened so as to discharge the batch from the hopper. The doors 22 and 19 are interconnected, by means not shown, so that they open and close simultaneously. The door 19 is opened upon clockwise rotation of a shaft 64, to which is rigidly connected a link 65 pivoted at its other end as indicated by the reference numeral 66 to a link 67 which is pivoted at 68 to the door 19 which is pivotally connected at 69 to the shroud 20. The door 19 stays closed against the action of the weight of the cement in the compartment 14 due to the fact that the pivot 66 is located at the right of a straight line drawn through the pivot points 68 and 64.

The arm 37, which is mounted on the rock-shaft 38, has a projecting portion 70 to which is pivoted one end of a link 71. The other end of the link is pivoted to a bell crank 72 which is pivoted at 73. To the other arm of the bell crank is connected a rope 74 which, when raised to the position indicated in Figure 3, trips a keeper for the counterpoise beam of the scale used to weigh the cement, thereby breaking an electrical contact in circuit with the solenoid 58. This allows the core 59 of the solenoid to drop to the position indicated in Figure 3 under the influence of spring 57, thereby moving the latch 55 into position to be engaged by the pin 46 so as to lock the gate 9 open. The connections between the rope 74 and the counterpoise beam keeper, and the means for deenergizing and energizing the solenoid are referred to more particularly in my copending application above referred to, but are not shown or claimed herein.

The operation of the device is as follows. When it is desired to weigh out a batch from the cement contained in bin 4, the gate 5 being open at this time, the handle 39 is rotated counter-clockwise from the position shown in Figure 2 to that shown in Figure 3. This moves the rod 35 to the left as shown in Figure 3, rotating shaft 30 clockwise and opening the gate 9. The gate 11 is also opened due to the sliding connection of the pin 46 on the arm 33 with the push rod 48. When the handle 39 is moved as described to open the gate 9, the rope 74 is raised, tripping the keeper for the counterpoise beam which has been set to weigh the cement and deenergizing the solenoid 58 so that the spring 57 moves the latch 55 into position to be engaged by the pin 46. After the desired amount of cement has been delivered to the compartment 14 in the weighing hopper 12, the solenoid is energized in a manner similar to that described in my application above referred to. This releases the latch 55 from the pin 46, whereupon the spring 43 rapidly closes the gate 9. The gate 11 is also closed after the main flow of concrete from the chute 6 has been cut off, the gate 11 intercepting the flow of any cement which may leak past the outlet of the chute 6.

After the cement has been delivered to the compartment 14 and the other ingredients, such as stone and sand, have been delivered to the compartment 15, the hopper gates 22 and the cement gate 19 which are interconnected with each other are opened so as to discharge the entire batch from the hopper.

I have illustrated and described the present preferred embodiment of my invention, but it will be understood that the invention may be otherwise embodied within the scope of the following claims.

I claim:

1. Apparatus for controlling the flow of material, comprising a chute having a discharge opening and a gate, a conduit into which the material is delivered from the chute, a gate for the conduit, an arm rotatable with the chute gate, means operably connected to the conduit gate for opening and closing it, and a sliding connection between said arm and said conduit gate operating means, whereby the conduit gate is closed to stop the flow of material leaking past the chute gate only after the chute gate has been closed to stop the main flow of material.

2. Apparatus for controlling the flow of material, comprising a chute having a discharge opening and a gate, a conduit into which the material is delivered from the chute, a gate for the conduit, an arm rotatable with the chute gate, means operably connected to the conduit gate for opening and closing it, said means being provided with a slot, a pin carried by said arm and fitting in said slot, and a latch cooperating with said pin to hold the chute gate open.

HAROLD E. McCRERY.